US005646079A

United States Patent [19]
Eckstein

[11] Patent Number: 5,646,079
[45] Date of Patent: Jul. 8, 1997

[54] REFRACTORY CERAMIC MASS AND ITS USE

[75] Inventor: Wilfried Eckstein, Trofaiach, Austria

[73] Assignee: Veitsch-Radex Aktiengesellschaft Fur Feuerfeste Erzeungnisse, Vienna, Austria

[21] Appl. No.: 498,436

[22] Filed: Jul. 5, 1995

Related U.S. Application Data

[63] Continuation of Ser. No. 327,104, Oct. 21, 1994, abandoned.

[30] Foreign Application Priority Data

Oct. 23, 1993 [DE] Germany ............... 43 36 269.9

[51] Int. Cl.$^6$ .................. C04B 35/04; C04B 35/10
[52] U.S. Cl. .................. 501/100; 501/99; 501/101; 501/122; 501/128; 427/230; 266/280; 75/301
[58] Field of Search .................. 501/99, 100, 101, 501/122, 128; 252/502, 506, 508, 509; 427/230; 75/301; 266/280

[56] References Cited

U.S. PATENT DOCUMENTS

| | | | |
|---|---|---|---|
| 4,061,501 | 12/1977 | Ivarsson et al. | 501/118 |
| 4,093,470 | 6/1978 | Cherry et al. | 501/100 |
| 4,307,197 | 12/1981 | Daniel et al. | 501/101 |
| 5,250,479 | 10/1993 | Rancoule et al. | 501/100 |
| 5,262,367 | 11/1993 | Sundell | 501/101 |

OTHER PUBLICATIONS

Searle "Refractory Materials: Their Manufacture & Uses", Third edition, Charles Griffin & Co., Limited, 1950, p. 469.

*Primary Examiner*—Mark L. Bell
*Assistant Examiner*—Michael Maicheschi
*Attorney, Agent, or Firm*—John F. A. Earley; John F. A. Earley, III

[57] ABSTRACT

The present invention pertains to an electrically conductive, dry, refractory ceramic mass based on a refractory oxidic matrix material containing a source of carbon, such as graphite, carbon black or petroleum coke.

18 Claims, No Drawings

REFRACTORY CERAMIC MASS AND ITS USE

This is a continuation of application(s) Ser. No. 08/327,104 filed on Oct. 21, 1994 now abandoned.

The present invention pertains to an electrically conductive, dry refractory ceramic mass based on a refractory oxidic matrix material containing a source of carbon, such as graphite, carbon black or petroleum coke.

Such bodies, as well as bricks prepared from them have been known, e.g., as so-called magnesia-carbon bricks. These refractory products and their use in d.c. arc furnaces are described in *Radex-Rundschau*, Nos. 2/3, 1992, 83, and No. 4, 1992, 208.

There have been various design systems, which are described in, e.g., *Radex-Rundschau*, No. 4/92, 199, for the conductive hearth of such an arc furnace.

The following special requirements on electrically conductive refractory building materials in the hearth of a d.c. furnace appear from this document:

the electrical resistance should be as low as possible,
the thermal conductivity should also be low,
the service life of the refractory material should be as high as possible.

Since refractory ceramic materials are considered, in general, to be insulators, their special adaptation to the said field of application, i.e., the hearth of a D.C. furnace, is necessary. The electrical resistance of resin-bound bricks is lower than that of the conventional products. Even though the electrical conductivity of magnesia-carbon bricks increases with increasing graphite content, the thermal conductivity also increases at the same time.

Carbon-containing magnesite bricks and masses, which contain tar or tar substitutes as the binder, were developed in this connection.

Even though these electrically conductive refractory products have generally proved to be successful, there is a need for alternative products, which can also be prepared without the said tar binder, in order to prevent the release of smoke observed during heating and to optimize the product from hygienic and environmental viewpoints. Experience has shown that the exclusive combination of a refractory material with carbon is not sufficient to achieve the desired sintering of the components.

A mass, which additionally contains reactive silicic acid, besides the refractory matrix material and carbon, was developed in experiments according to the present invention. The present invention is based on the discovery that the addition of reactive silicic acid markedly improves the sintering (ceramic bonding) of the components, besides the carbon (mostly in the form of graphite, especially flake graphite, carbon black or petroleum coke), which is added to achieve electrical conductivity.

Another advantage is the fact that the mass consisting of refractory matrix material, carbon and reactive silicic acid has a high electrical conductivity even at room temperature, and thus it especially has an advantageous effect on the cold start of a d.c. arc furnace lined with this mass or with bricks prepared from it.

Volatile and/or environmentally hazardous emissions are not generated either during preparation or during use.

Consequently, the present invention pertains, in its most general embodiment, to an electrically conductive refractory mass based on a refractory oxidic matrix material containing a source of carbon, such as carbon black, graphite or petroleum coke, and additionally a reactive silicic acid.

The reactive silicic acid is preferably in the dry form. This makes it possible to process the mass by tamping or vibration, and deaeration can be achieved by simple poking.

The use of a microsilica, i.e., an extremely finely dispersed, dry, reactive silicic acid, represents an advantageous choice.

The silicatic component reacts with magnesia or corundum even at temperatures of ca. 700° C. Forsterite ($Mg_2SiO_4$) or mullite ($Al_6Si_2O_{13}$) is formed. High refractoriness is guaranteed by the high melting points (above 1,800° C.) of these phases. The said reactions take place due to the high reactivity of microsilica despite the addition of carbon, which normally inhibits sintering. However, the reactive silicic acid may also be used in the form of a silica gel or silica sol.

According to one embodiment, the mass is characterized by the following composition of its components, in wt. %.

3 to 12% of graphite, carbon black or petroleum coke,
3 to 10% of reactive silicic acid,
the rest being refractory matrix material.

The addition of 5 to 10 wt. % of the carbon source and of the reactive silicic acid each proved to be sufficient in experiments.

The refractory oxidic matrix material is, e.g., sintered magnesite, but it is also possible to use a nonbasic material, such as aluminum oxide ($Al_2O_3$).

The particle fraction of the refractory matrix material is in the usual ranges and is less than 5 mm according to one embodiment.

To achieve homogeneous distribution, the carbon source is added in the most finely dispersed form possible, i.e., in a particle fraction of <500 μm and preferably 200 μm. Flake graphite represents a preferred choice from this group.

According to other embodiments of the present invention, a low-iron (<1.0 wt. %) sintered magnesite is used,
a low-lime (<4.0 wt. %) sintered magnesite is used,
the mass is adjusted such that the $CaO/SiO_2$ ratio is less than 0.5.

Especially the use of a low-iron sintered material leads to a markedly improved wear behavior compared with tar-bound masses.

As was described, the mass may be introduced in the dry form into the hearth of an electric furnace, especially a d.c. electric furnace. It is compacted there by tamping, vibration or the like. Sintering of the mass, which is particularly facilitated and promoted by the reactive silicic acid, takes place during the start-up (first charge). The desired electrical conductivity is at the same time ensured by the carbon component.

Processing the mass into shaped parts, especially bricks, for which conventional processes may be used, is within the scope of the present invention. The bricks are subsequently fired, preferably in a temperature range between 900° C. and 300° C., and a temperature of ca. 1,000° C. was found to be sufficient to achieve a sufficient strength.

Consequently, the present invention also pertains to the use of the mass for preparing refractory shaped parts after shaping and firing at temperatures between 900 and 1,300° C.

Even though the mass can be used for various purposes (e.g., for lining a bottom joint in a converter), the lining of a hearth for a d.c. arc furnace represents a particularly advantageous use. This also applies to the bricks prepared from the mass.

The mass can be used for preparing new furnace linings and for the hot repair of furnace linings. During hot repair, the mass is rapidly sintered by the existing residual heat of the furnace. Additional characteristics of the present invention will become apparent from the features of the subclaims as well as from the other application documents.

The present invention will be explained in greater detail below on the basis of two exemplary embodiments.

EXAMPLE A

An alpine sintered magnesite (with a CaO content of ca. 2 wt. %) containing 5 wt. % of graphite, 1 wt. % of carbon black, and 5 wt. % of microsilica is mixed homogeneously and applied by tamping in the hearth area of a d.c. arc furnace. The mass has a low electrical resistance even at the cold start, i.e., it has a high electrical conductivity. The thermal conductivity is also low, and the service life of the mass corresponds to that of comparable products, even though no binder, such as tar, pitch or the like was added, and the associated emissions of volatile components were thus eliminated. The percentage of microsilica assumes the function of a binder and ensures excellent sintering of the mass in the hearth.

EXAMPLE B

A dry mass with a particle size of <5 mm of the following chemical analysis (data in wt. %) is obtained:

| | |
|---|---|
| MgO | 87–91 |
| $Fe_2O_3$ | 0.1–0.3 |
| $Al_2O_3$ | 0.1–0.3 |
| CaO | 0.4–1.0 |
| $SiO_2$ | 4–7 |
| Total C | 4–7. |

The mass is characterized by good ceramic bonding at a possible application temperature above 1,750° C. It is introduced into the hearth of a d.c. arc furnace in a thickness of ca. 150 mm and is compacted by poking. The cold compression strength is ca. 15 N/mm².

I claim:

1. Method of lining a hearth of an electric furnace, comprising the steps of providing a refractory ceramic mass comprising a refractory oxide as a matrix material, the matrix material further comprising carbon and a reactive silica, the carbon comprises graphite, flake graphite, carbon black, petroleum coke, or combinations thereof, and lining the hearth of the electric furnace with the ceramic mass.

2. Method in accordance with claim 1, in which the reactive silica is in dry form.

3. Method in accordance with claim 1, in which the reactive silica is in the form of microsilica.

4. Method in accordance with claim 1 in which the reactive silica is in the form of a silica gel or silica sol.

5. Method in accordance with claim 1, with the following composition, in wt. %:

3 to 12 wt. % of graphite, carbon black or petroleum coke, 3 to 10 wt. % of reactive silica, the balance being refractory matrix material.

6. Method in accordance with claim 5, with the following composition, in wt. %:

5 to 10% of graphite, carbon black or petroleum coke, 5 to 10% of reactive silica, the balance being refractory matrix material.

7. Method in accordance with claim 1, in which the refractory oxide is sintered magnesite.

8. Method in accordance with claim 7, in which the sintered magnesite has an $Fe_2O_3$ content of less than 1.0 wt. %.

9. Method in accordance with claim 7 in which the sintered magnesite has a CaO content of less than 4 wt. %.

10. Method in accordance with claim 9, the mass having a $CaO/SiO_2$ ratio of less than 0.5.

11. Method in accordance with claim 1, in which the refractory oxide is $Al_2O_3$.

12. Method in accordance with claim 1, the refractory oxide having a particle fraction of less than 5 mm.

13. Method in accordance with claim 1, the carbon having a particle fraction of <500 μm.

14. Method in accordance with claim 13, in which the carbon source is in a particle fraction of the carbon is <200 μm.

15. Method in accordance with claim 1, further including the steps of processing the refractory ceramic mass into shaped parts and firing the shaped parts at temperatures between 900° and 1,300° C. prior to placing the refractory ceramic mass into the hearth of the electric furnace to form a lining.

16. Method in accordance with claim 2, in which the reactive silica is microsilica.

17. Method in accordance with claim 8, in which the sintered magnesite has a CaO content of less than 4 wt. %.

18. Method of lining a hearth of an electric furnace, comprising the steps of providing a refractory ceramic mass comprising a refractory oxide as a matrix material, the matrix material further comprising carbon and reactive silica, the carbon comprises graphite, flake graphite, carbon black, petroleum coke, or combinations thereof, in which the reactive silica is in dry form and is microsilica, the mass having the following composition, in wt. %:

5 to 10% of graphite, carbon black, flake graphite, petroleum coke, or combinations thereof, 5 to 10% of reactive silica, the balance being refractory matrix material, in which the refractory oxide is sintered magnesite, in which the sintered magnesite has an $Fe_2O_3$ content of less than 1.0 wt. %, in which the sintered magnesite has a CaO content of less than 4 wt. %, in which the mass has a $CaO/SiO_2$ ratio of less than 0.5, wherein the refractory oxide has a particle fraction of less than 5 mm, and wherein the carbon has a particle fraction of <200 μm, and lining the hearth of the electric furnace with the refractory ceramic mass.

* * * * *